R. L. O. FAERBER.
DIFFERENTIAL LOCK FOR AUTOMOBILES.
APPLICATION FILED AUG. 21, 1916.
1,263,655. Patented Apr. 23, 1918.
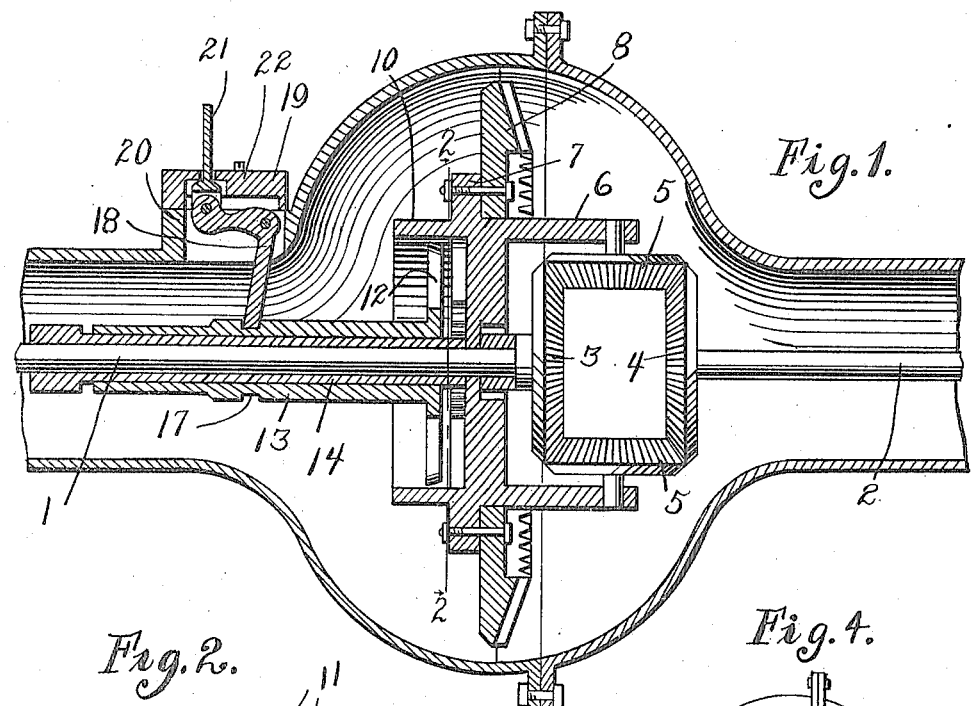
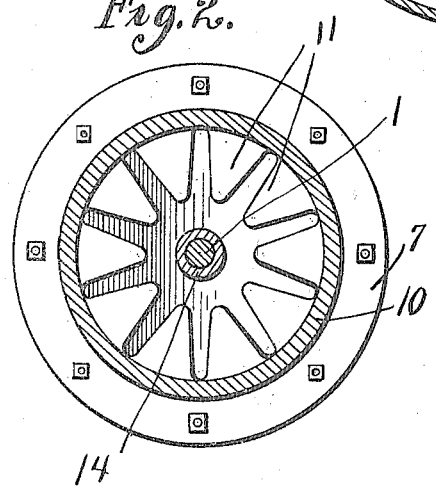
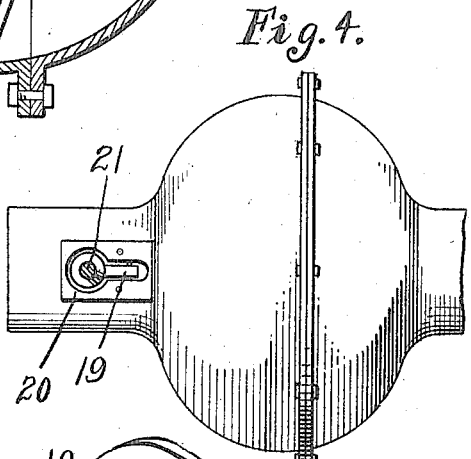
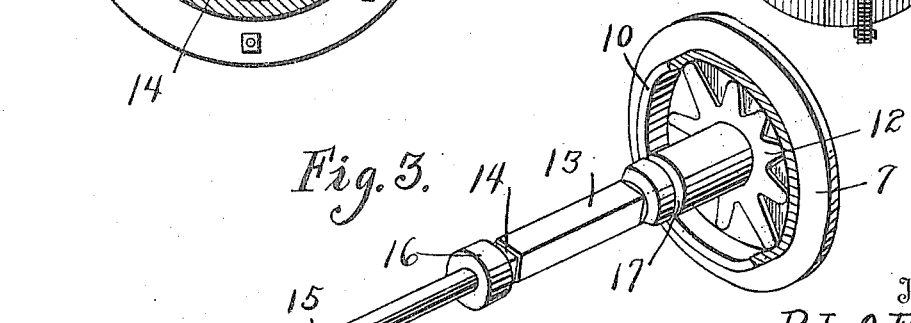
Inventor
R. L. O. Faerber
Witness
Arthur K. Moore
By
Attorneys

UNITED STATES PATENT OFFICE.

RUDOLF L. O. FAERBER, OF KIEL, OKLAHOMA.

DIFFERENTIAL LOCK FOR AUTOMOBILES.

1,263,655.  Specification of Letters Patent.  Patented Apr. 23, 1918.

Application filed August 21, 1916. Serial No. 116,142.

*To all whom it may concern:*

Be it known that I, RUDOLF L. O. FAERBER, a citizen of the United States, residing at Kiel, in the county of Kingfisher, State of Oklahoma, have invented certain new and useful Improvements in Differential Locks for Automobiles; and I do hereby declare the following to be a full, clear, and exact description of the invention, such as will enable others skilled in the art to which it appertains to make and use the same.

This invention pertains to the class of differential gearings, and has particular reference to a device for locking together the elements of the differential upon the rear axle of an automobile in order that the axle sections may be positively driven in unison.

The invention has for its object to provide a means for rigidly locking together the axle sections of an automobile axle when it is advantageous to dispense with the differential action, as when driving over roads which are heavy with mud or sand, or when driving over a tilted road where the traction is placed almost wholly upon one wheel. In carrying out my invention, I provide a mechanism which may be shifted into or out of locking engagement at the will of the automobile driver, by a suitable operating lever or pedal, disposed adjacent the driving seat, and operatively connected to the locking device for that purpose.

With the above and other objects which may hereinafter appear in view, my invention will now be fully set forth and described, reference being had to the accompanying drawings.

In the drawings,

Figure 1 is a vertical longitudinal section through the differential, and differential casing, showing my invention applied thereto, Fig. 2 is a section on line 2—2 of Fig. 1, Fig. 3 is a perspective view of a portion of the differential lock partly broken away for the sake of clearness, and Fig. 4 is a plan view of the differential casing, with a cover plate removed.

Referring more particularly to said drawings, 1 and 2 represent respectively the axle sections of an automobile driving axle, upon whose opposing ends are carried the beveled gears 3 and 4. Meshing with the beveled gears 3 and 4 are the beveled pinions 5, the frame 6 supporting said pinions 5, and being carried by or secured to, a disk or plate 7. Also carried by said disk 7 outside of the frame 6 is the usual beveled gear driving wheel 8 which meshes with the usual beveled pinion from the driving shaft. Said plate or disk 7 is comparatively heavy in construction, and is provided with annular flange 10 extending from its free face. Said flange 10 is spaced inwardly from the extreme margin of the disk 7, and forms a housing for a series of inwardly projecting teeth 11. Said teeth 11, together with the central space which they surround form a recess or pocket into which a star wheel 12 is adapted to be seated, said star wheel 12 being at all times contained within the housing space of the flange 10. The star wheel 12 is carried from the end of a sleeve 13, having a square bore and being slidable upon a correspondingly squared bushing 14, fixed upon the axle-section 1, a head 16 upon the outer end of the bushing 14 providing a stop for the sleeve 13. A shipper groove 17 formed in the sleeve 13, is engaged by the arms of a shipper 18 mounted within the differential casing. Referring to Figs. 1 and 4, it will be noted that the shipper 18 is provided with a bell crank extension 19 whose angular portion has a bearing in a boxing 20 formed upon the differential casing, and has its free end connected to a rod 21 which extends through the removable cover plate 22. Obviously, the rod 21 can be connected in any suitable manner to a hand lever or foot pedal at the driver's seat.

Obviously, under ordinary conditions the star wheel 12 is held out of engagement with the teeth 11, and stands free within the housing space of the flange 10. When, however, the automobile strikes such road conditions that it becomes desirable to use all of the tractive power of both wheels, the collar 13 is shipped to carry the star wheel into engagement so that the beveled gear driving wheel 8 is locked to the shaft, whereby the two sections of the driving axle will be rigidly connected so that both wheels will be equally driven. It should also be noted that the improved construction creates a saving in tires, since it avoids the spinning of the wheel which has the least tractive power, as when it is in a mud hole or sand while the other is upon solid ground.

What I claim as my invention is:—

A differential lock, comprising in combination with an axle and a differential support having a comparatively widely extended face at right angles to the axle and a star-shaped recess around the axle, a star wheel slidable on the axle and movable into said star-shaped recess, said star-wheel consisting of a flat plate having radiating tapered arms shaped to fit within the arms of the recess, and means to move the star-wheel into and out of the recess.

In testimony whereof, I affix my signature, in the presence of two witnesses.

RUDOLF L. O. FAERBER.

Witnesses:
 EARL GLAZIER,
 G. I. MATTHEWS.

Copies of this patent may be obtained for five cents each, by addressing the "Commissioner of Patents, Washington, D. C."